Inventor
FREDERICK P. MASON
By [signature]
Attorney

Inventor
FREDERICK P. MASON
By [signature]
Attorney

Inventor
FREDERICK P. MASON
By [signature]
Attorney 3,110,765
Patented Nov. 12, 1963

3,110,765

FACSIMILE APPARATUS FOR DERIVING BLACK AND WHITE SIGNALS FROM COLOR COPY

Frederick Percival Mason, Croydon, England, assignor to Creed & Company Limited, Croydon, England, a British company Filed June 25, 1962, Ser. No. 204,722
Claims priority, application Great Britain July 14, 1961
7 Claims. (Cl. 178—7.1)

This invention relates to facsimile apparatus.

Commercial documents, the contents of which are required to be transmitted from a facsimile transmitting station to a facsimile receiving station, are sometimes inscribed in colours other than black, and very often cases of inscription in red, blue or green colour on such documents. Whilst reception of the message in the same colour as the original document would be ideal, the technical complications and consequent cost preclude this facility. It is reasonable and sufficient therefore to receive coloured inscriptions in black. For this purpose the scanner at the transmitting station must read inscriptions in a variety of colours with equal facility.

In known facsimile transmitting apparatus the spectral contents of the source of light may be wide or narrow. An example of a wide-band illuminant is an incandescent metal lamp and examples of narrow-band illuminants are lamps using phosphors and ionized gases. The spectral response of photosensitors used in facsimile transmitters is generally narrow, and examples of such devices responding principally to red light are those using caesium cathodes and those having germanium or silicon PN junctions, whilst examples of devices responding principally to blue light are those using antimony cathodes.

Whilst the colour of a message-form or the like being scanned may be of any hue, in general it is only necessary to consider a message-form of which is white or of a whitish hue. Such a message-form will appear red in the presence of red light and blue in the presence of blue light. The colour of the inscription of such a message-form may be of any hue and for the purpose of describing an embodiment of the present invention inscriptions in red and blue only are considered.

In considering various combinations of illuminants and photosensitors, it will be readily understood that a red sensitive photosensitor will respond to emit an electric current signal when the red spectral content of a wide band of light from an illuminant is directed to it by reflection from a white or whitish message-form or the like, and from any red inscription thereon. Should there be any blue inscription, the red spectral content of the light from the illuminant will not be reflected and the photosensitor will not respond to emit an electric current signal.

Considering now in combination a source of wide band light and a blue sensitive photo-cell, the blue sensitive photo-cell will respond to emit an electric current signal when the blue spectral content of the wide band light is directed to it by reflection from the white or whitish message-form or the like and from any blue inscription thereon. Should there be any red inscription, the blue spectral content of the light will not be reflected and the photosensitor will not respond to emit an electric current-signal.

Considering now a source of narrow band light, it will be understood that an electric current signal will be emitted from a photosensitor receiving light from that source only if the photosensitor is responsive to the spectral content of the band. For a source of light having only a red spectral content, then only a red sensitive photo-cell would respond; similarly a source of light having only a blue spectral content, then only a blue sensitive photo-cell would respond.

According to one aspect of the present invention therefore there is provided facsimile apparatus including a scanning system for scanning a message-form or the like, said scanning system having a source emitting therefrom light over a wide band of the colour spectrum and a plurality of photosensitors each of which is responsive to different bands of light within the said wide band, said apparatus further including electric gating means connected to each of said photosensitors and to a source of electric potential, the said gating means being arranged to pass an electric current signal therethrough only in the event of a response from all said photosensitors.

According to a further aspect of the invention therefore there is provided facsimile apparatus including a scanning drum, a scanning system having a source emitting light over a wide band of the colour spectrum, a plurality of photosensitors each of which generates an electric current signal in response to light from said source reflected from a message-form or the like carried on said scanning drum, and each of which remains unresponsive to light reflected thereto from indicia inscribed on the message form when such indicia are of a colour different from the colour to which the photosensitors is responsive; a source of electric potential; and gating means operative to pass an electric current therethrough from said source only in the presence of electric current signals applied thereto from all the photosensitors.

Embodiments of the invention will now be described with reference to the accompanying drawings in which.

Figure 1:
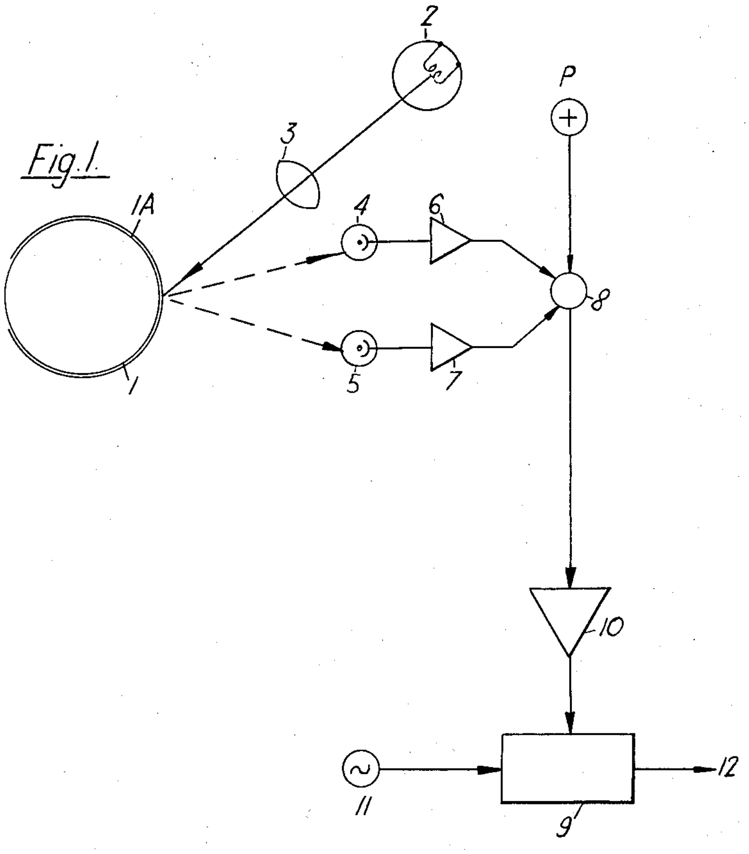
FIG. 1 shows a schematic arrangement of facsimile apparatus according to one embodiment of the invention.

Referring firstly to FIG. 1, over a wide band of the colour spectrum is directed from a source 2 by way of a condensing lens 3 on to a message form M carried on a scanning drum 1. The drum 1 is subjected to rotational and axial motion to effect scanning of indicia inscribed on the message-form.

It is assumed, in this embodiment, that some of the indicia are inscribed on the message-form in red and blue. Light from the source 2 is reflected from the message-form on to photosensitors which in the present embodiment are photo-cells 4 and 5. Photo-cell 4 is responsive to the red light component of the colour spectrum and photo-cell 5 is responsive to the blue light component. Photo-cells 4 and 5 are electrically connected to an AND gate 8 by way of amplifiers 6 and 7 respectively. The gate 8 is electrically connected in turn to a source of positive potential P, and a modulator 9 by way of an amplifier 10. A transmission line 12 connected to a facsimile recording station is fed with a carrier signal from an oscillator 11 by way of modulator 9.

When the message-form M is being scanned in the absence of coloured indicia inscribed thereon, the red and blue light components of the colour spectrum reflected from the surface of the message-form M are intercepted by the photo-cells 4 and 5 respectively. Each of these photo-cells responds to generate an electric current signal which is applied to the AND gate 8, via amplifiers 6 and 7 respectively. The effect of the application of electric current signals from both photo-cells is to render gate 8 operative to permit the passage therethrough of a positive potential from source P to the modulator 9, via the amplifier 10, to switch the modulator on.

In the "ON" condition of the modulator 9, the carrier signal from oscillator 11 is applied to line 12 connected to the distant facsimile recording station. The presence of the signal on the line 12 is indicative of the message-form being scanned over an area which is free from inscribed indicia, and thus this carrier signal is applied to an inverter means at the recording station to render the recording stylus thereat inoperative.

When a red inscription on the message-form is being scanned only photo-cell 4 will respond to emit an electric current signal to gate 8 in response to the red light component of the colour spectrum, and photo-cell 5, responsive to the blue component only, will remain unresponsive. In consequence gate 8 is inoperative to permit the passage therethrough of the positive potential from source P to the modulator 9, via amplifier 10. The modulator 9 is thus switched "OFF" and the carrier signal from oscillator 11 is cut off from line 12. This absence of the carrier signal on line 12 is sensed by the inverting means at the distant recording station and its associated stylus is rendered operative to produce a facsimile copy in black or any chosen colour, of the red inscribed indicia being scanned at the transmitting station. Similarly, if blue inscribed indicia is being scanned, only photocell 5 will respond to emit an electric current signal to gate 8 in response to the blue light component of the colour spectrum reflected thereto from the red inscribed indicia, photo-cell 4 responsive to the red component will remain unresponsive, and gate 8 will be rendered inoperative. In consequence, and in the same way as for the scanning of red inscription, the stylus at the recording station is rendered operative to produce a facsimile copy in black or any chosen colour of the blue indicia being scanned at the transmitting station.

It will be readily understood that the light source may comprise a number of devices each of which emits light embracing a particular portion of the colour spectrum and which portions are different from device to device. Collectively then, the devices will emit light over a wide band of the colour spectrum. Whilst in the apparatus of the embodiment described only two photo-cells have been used, a greater number may be provided and each of which is responsive to a particular portion of the colour spectrum different from the portions to which the others respond. Thus indicia in colours other than red or blue may be read with equal facility. In apparatus in which a number of photo-cells greater than two is utilised then the gating means 8 must necessarily be of a type operative in the presence of electric current signals from all of the greater number of photo-cells to permit the passage of the electric potential from source P therethrough.

In order that the resolution of the indicia is not limited by the size of the light source optical systems such as are now to be described with reference to FIGS. 2 and 3 may be incorporated in the the apparatus.

Figure 2:
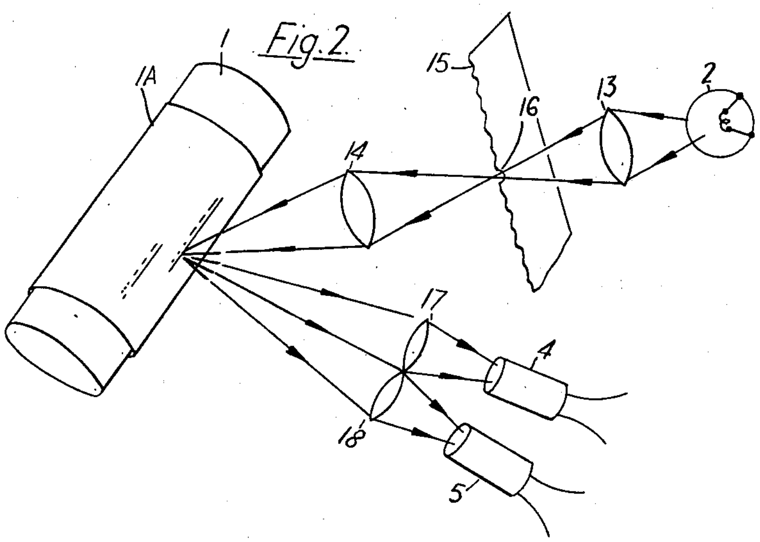
FIG. 2 shows a general arrangement of optical systems associated with the embodiment of FIG. 1.

Referring first to the system shown in FIG. 2, a concentration of light from a point at source 2 to a point on the message-form, or on to indicia inscribed thereon is achieved by providing, instead of a single condensing lens 3 as in FIG. 1, a pair of condensing lenses 13 and 14 and a plate 15 having an aperture 16 therethrough, disposed between the lenses. Light from the source 2 through the agency of lens 13 illuminates plate 15 intensely in the region of the aperture 16. Light penetrating through aperture 16 is produced virtually from a point source, and an image of this point source is formed through lens 14 either on the message-form or on to indicia inscribed thereon. In order to concentrate the light reflected from the message-form on to the photo-cells 4 and 5 condensing lenses 17 and 18 are respectively disposed between the message-form and the photo-cells.

Figure 3:
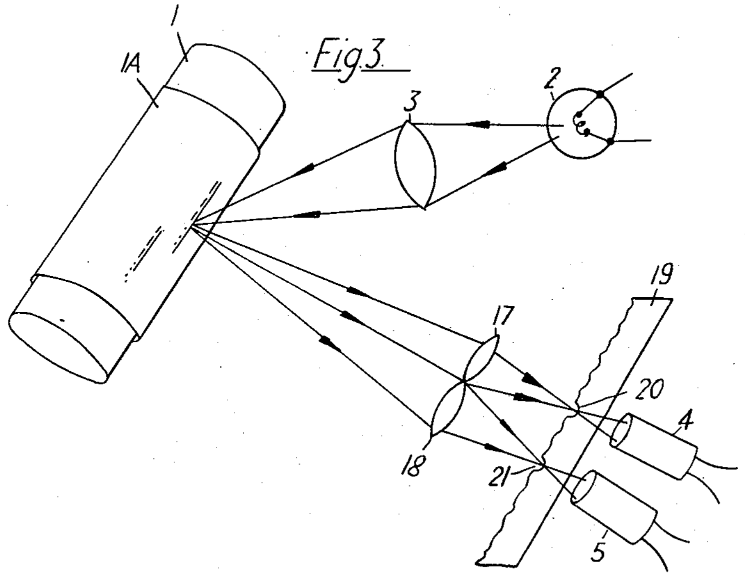
FIG. 3 shows a modification of the general arrangement of optical systems shown in FIG. 2.

A variation in the arrangement of the system shown in FIG. 2, is shown in FIG. 3. In this arrangement a single condensing lens 3 is disposed between the light source 2 and the scanning drum 1 to concentrate light on to the message-form, and a pair of condensing lenses 17 and 18 and a plate 19 having apertures 20 and 21 are disposed between the scanning drum 1 and the photo-cells 4 and 5. The apertured plate 19 is so placed that its two apertures 20 and 21, and the surface of the message-form, are at conjugate foci of condensing lenses 17 and 18 respectively, so that light penetrating apertures 20 and 21 is concentrated to photo-cells 4 and 5 respectively.

What I claim is:

1. Facsimile apparatus including a scanning system for scanning a message-form or the like, said scanning system comprising a source adapted to illuminate said message-form with light over a wide band of the colour spectrum, and a plurality of photosensitors arranged so as to receive light from said message-form, each of said photosensitors being responsive to a different band of light within the said wide band, said apparatus further comprising electric gating means connected to each of said photosensitors and to a source of electric potential, said gating means being arranged to pass an electric current signal therethrough only in the event of a response from all of the said photosensitors.

2. Facsimile apparatus, as claimed in claim 1, in which said scanning system comprises a plurality of sources of light each emitting light over a different narrow band of the colour spectrum from the others, and a plurality of photosensitors each of which is responsive only to light of a particular one of said narrow bands.

3. Facsimile apparatus comprising a scanning drum, adapted to carry a message-form, a scanning system having a source illuminating said drum with light over a wide band of the colour spectrum, a plurality of photosensitors arranged to receive light from said source reflected from said message-form carried on said drum, each of said photosensitors being able to generate an electric current signal in response to light from said source reflected from said message-form, and adapted to remain unresponsive to light reflected thereto from indicia inscribed on the message-form when such indicia are of a colour different from the colour to which the photosensitor is responsive, a source of electric potential, and gating means operative to pass an electric current therethrough from said source of potential only in the presence of electric current signals applied thereto from all the photosensitors.

4. Facsimile apparatus, as claimed in claim 3, in further comprising oscillator means for generating a carrier signal, and means for modulating said signal in response to an electric potential applied thereto from the source of potential and the gating means.

5. Facsimile apparatus, as claimed in claim 3, further comprising first and second optical systems disposed respectively between the source of illumination and the scanning drum and between said scanning drum and the plurality of photosensitors, said first optical system adapted to concentrate light from said source to a point on the said message-form carried on said drum, and said second optical system adapted to concentrate light from said source reflected from said message-form or from indicia inscribed thereon to each one of said photosensitors.

6. Facsimile apparatus, as claimed in claim 5, in which the first optical system comprises an apertured plate and at least one condensing lens disposed on either side thereof, and in which the second optical system comprises at least one condensing lens for each one of said photosensitors.

7. Facsimile apparatus, as claimed in claim 5, in which the first optical system comprises at least one condensing lens, and in which the second optical system comprises at least one condensing lens for each one of the photosensitors and an apertured plate disposed between the lenses and the said photosensitors, said plate having a hole therethrough for each one of said photosensitors.

No references cited.